United States Patent [19]
Giorgio et al.

[11] Patent Number: 6,021,431
[45] Date of Patent: *Feb. 1, 2000

[54] METHOD OF RETRIEVING AND STORING COMPUTER PERIPHERAL DATA

[75] Inventors: Paul J. Giorgio, Providence; Stephen J. Amuro, Middletown, both of R.I.

[73] Assignee: The United States of America as represented by the Secretary of the Navy, Washington, D.C.

[ * ] Notice: This patent is subject to a terminal disclaimer.

[21] Appl. No.: 08/219,554

[22] Filed: Mar. 29, 1994

[51] Int. Cl.[7] .............................. G06F 13/38; G06F 15/17
[52] U.S. Cl. .............................................................. 709/217
[58] Field of Search ............................. 364/200; 395/200, 395/DIG. 1; 709/217

[56] References Cited

U.S. PATENT DOCUMENTS

| | | | |
|---|---|---|---|
| 4,783,730 | 11/1988 | Fischer | 364/200 |
| 4,864,532 | 9/1989 | Reeve et al. | 364/900 |
| 5,471,634 | 11/1995 | Giorgio et al. | 395/200.01 |

OTHER PUBLICATIONS

ANSI X3.131–1986, pp. 26, 51–71, 80–82, 185–186, 194–199, 208–209.

Primary Examiner—Mark H. Rinehart
Attorney, Agent, or Firm—Michael J. McGowan; Robert W. Gauthier; Prithvi C. Lall

[57] ABSTRACT

An improved method of having an SCSI controller provide a logical connection between a plurality of host processors using a single SCSI initiator. The controller contains removable host adapters for connection to any type of host processor interface. When a host processor requests status information of a target device, that status information is passed to the requesting processor and subsequently stored in the controller and made available to all other host processors. The advantage to such a controller is the expanded number of host processor connections to a single SCSI initiator whereby each host processor can independently and logically connect through the controller and SCSI initiator to a target without clearing target status information for other host processors. The invention is particularly advantageous when adapted to function in a local area network (LAN) arrangement where a significant number of host processors are requesting data from one mass storage device.

5 Claims, 4 Drawing Sheets

METHOD OF RETRIEVING AND STORING COMPUTER PERIPHERAL DATA

CROSS-REFERENCE TO RELATED PATENT APPLICATIONS

This patent application is co-pending with five related patent applications entitled Non-intrusive SCSI Status Sensing System (U.S. patent application Ser. No. 08/219,553), SCSI Controller with Target Status Retrieval (U.S. patent application Ser. No. 08/219,552), Network File Server with Automatic Sensing Means (U.S. patent application Ser. No. 08/219,556), Method of Non-intrusively Sensing Status in a Computer Peripheral (U.S. patent application Ser. No. 08/219,557), and Method of Sensing Target Status in a Local Area Network (U.S. patent application Ser. No. 08/219,555) by the same inventors as this application.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to a process for interfacing a plurality of processors through a single Small Computer System Interface (SCSI) initiator disposed within a controller to a plurality of SCSI peripheral devices. More particularly, the process described in the present invention provides a logical connection between a plurality of processors, herein referred to as host processors, and a single SCSI initiator located within the controller. When connected to the controller, the plurality of host processors can independently communicate with a plurality of SCSI peripherals or, as defined in the American National Standards Institute (ANSI) SCSI specification, target devices through the single SCSI initiator via industry standard or user defined interfaces, protocols, and commands. The process enables target status information that is cleared from the target's memory when the initiator requests status, to be stored by the controller for every host processor. The prior art system having a method of integrating one initiator within a controller to a plurality of SCSI target devices is replaced with a new and improved method that expands the current protocol arrangement between one SCSI initiator and a plurality of SCSI targets and removes the need to add initiators as the number of host processors increases.

(2) Description of the Prior Art

Many types of peripheral devices can be interfaced to digital computers. For example, mass storage devices are used by computers to store and retrieve information. These devices utilize different types of media such as magnetic tape, magnetic disk, optical disk, or semiconductor memory. Each type of peripheral requires a unique, or device specific, interface. The American National Standards Institute has approved standard X3.131-1986, designated the Small Computer Systems Interface or SCSI-I, that allows a computer system to connect, through a device called an initiator, to a plurality of dissimilar peripheral devices;, or SCSI targets, using high level device independent commands. The connection from the computer system to these targets is made through the SCSI initiator. The initiator sends commands to targets as defined in the ANSI standard, and the targets respond to these commands. ANSI standard X3.131-1986 permits one initiator to communicate with up to seven physical devices or targets in a time shared arrangement. More than one initiator can be used. However, the total number of initiators and targets cannot exceed eight. Target status conditions are reported to the requesting initiator and subsequently to the requesting processor which communicates with the initiator. In the prior art, once a target's status is reported from the target through the initiator to the processor, that status information, normally stored in the target's controller, is cleared. If another processor were to connect to the same initiator and request status information on the same target, that information would not be available. Thus, the prior art system of using one initiator for multiple processors is disadvantageous in that if one processor receives and subsequently clears all target status information, other processors connected to that initiator are unaware of any changes that may have been made in the target's status. The only method currently available, prior to the present invention, that would retain status information and make it available to a second host processor is to add a second initiator, connect the second processor to the second initiator, and connect the second initiator to the SCSI bus. Since the total number of targets and initiators is limited, adding another initiator decreases the total number of targets that the system can handle.

SUMMARY OF THE INVENTION

Accordingly, it is a general purpose and object of the present invention to provide an improved method for interfacing a plurality of host processors to a plurality of SCSI target devices. A more specific object is to maintain the status condition for every SCSI target connected to a controller and provide that status to any requesting host processor connected to the controller and to obtain this object using only one SCSI initiator.

These objects are accomplished with the present invention by providing the method described herein. When a host processor is sues a command to the controller and the controller receives a CHECK CONDITION status from a target, the controller will automatically interrogate the status of the requested target device and store that status for all host processors. When target status is requested and sent to a host processor, the controller clears its memory of that status corresponding to that host processor and that target. Each processor can request and subsequently receive target status information independently of the other using only one initiator. If additional host processors are added, the number of SCSI initiators does not have to be changed; the inventive process enables a single SCSI initiator to be used.

The controller, described in the present invention, is typically a personal computer (PC), a workstation, or any type of embedded controller comprised of removable host adapters that provide the interface to the host processors. The host processors can be connected to the controller in any of a plurality of interface and protocol arrangements.

BRIEF DESCRIPTION OF THE DRAWINGS

For a more complete understanding of the present invention and the advantages thereof, reference is now made to the following description of the preferred embodiment taken in conjunction with the accompanying drawings in which.

DESCRIPTION OF THE PREFERRED EMBODIMENT

Figure 1:
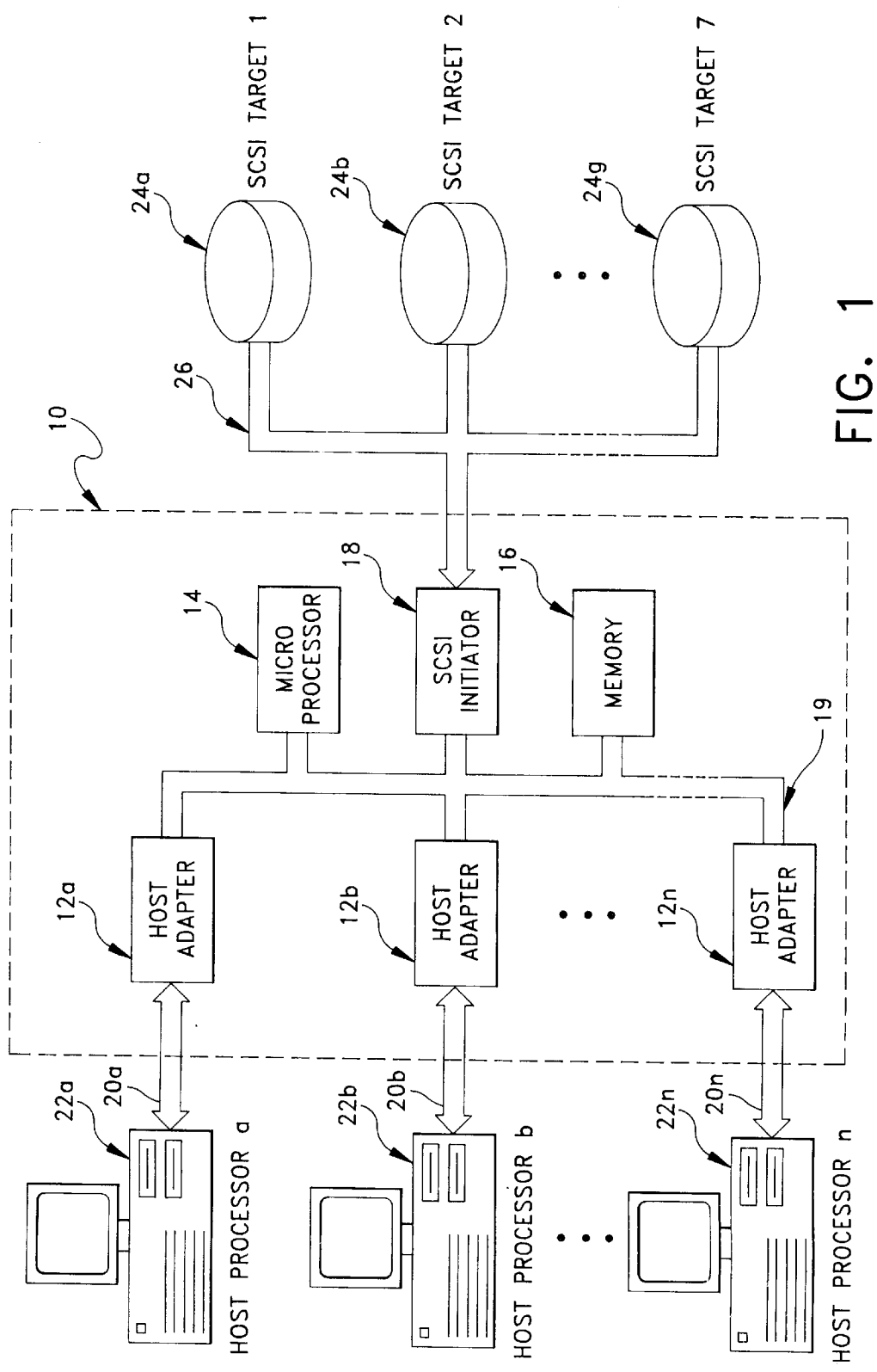
FIG. 1 is a block diagram of an SCSI controller connected to external host processors and SCSI target devices in accordance with the present invention.

Refer now to the drawing of FIG. 1 for a general description of the operation of the system and the components required to carry out its operation. A more detailed description is given later on with reference to the remaining figures. In all figures, identical components within the system carry identical numerals and letters. However, if a component in one figure is represented in other figures by various components, then different markings are used to denote each component not shown in the one figure.

FIG. 1 shows an SCSI controller 10 comprised of a plurality of host adapters 12a–n, a microprocessor 14, memory 16, and an SCSI initiator 18. All of these elements are electrically and logically connected using internal bus 19. Input/output interface means 20a–n connect respective host adapters 12a–n to respective host processors 22a–n. SCSI targets 24a–g connect to the SCSI initiator 18 of controller 10 by means of SCSI bus 26.

Host adapters 12a–n can be any integrated circuit or printed circuit card used for interfacing input/output devices to a computer. If, for example, host processor 22a is using an industry standard RS-232 serial protocol, then host adapter 12a would be a Universal Asynchronous Receiver Transmitter (UART) such as the Motorola 6850. Typically, if controller 10 includes a commercially available personal computer, then host adapter 12a would be a serial input/output printed circuit card. In another example, host processor 22b uses a parallel input/output protocol and host adapter 122b is a standard peripheral interface adapter (PIA) such as Motorola 6820. Again this could be a parallel input/output printed circuit card if controller 10 is arranged as a personal computer. If host processors 12a–n are connected to a local area network (LAN), then only one host adapter 12a is necessary and would function as a LAN controller such as an Ethernet or Fiber Distributed Data Interface (FDDI) controller. It is obvious to one of skill in the art the selection of the type and manufacturer of UART, peripheral interface adapter, or network controller that can be used. Other types of host processor interfaces and protocols can also be accommodated, provided the signal levels, protocol, and timing sequences are defined.

Microprocessor 14 is any commercially available microprocessor or microcontroller utilizing 8, 16, 32, or any other number of bits for a data path. In a typical embodiment, microprocessor 14 is a standard microprocessor used with personal computers such as the INTEL 80386 or 80486. Typically, controller 10 is a commercially available personal computer (PC) with expansion slots for accommodating external devices. The personal computer uses an industry standard operating system, such as DOS, and executes industry standard network management and file server software.

SCSI initiator 18 is an off-the-shelf commercially available integrated circuit (IC) such as the Fujitsu MB7030 or an SCSI printed circuit card. SCSI initiator cards typically are purchased with interface software so that the card, once inserted into a personal computer, can operate without the operator having to develop any unique software. This is typically the case when the personal computer is configured as a file server in a local area network (LAN) topology that services a plurality of host processors.

Figure 2:
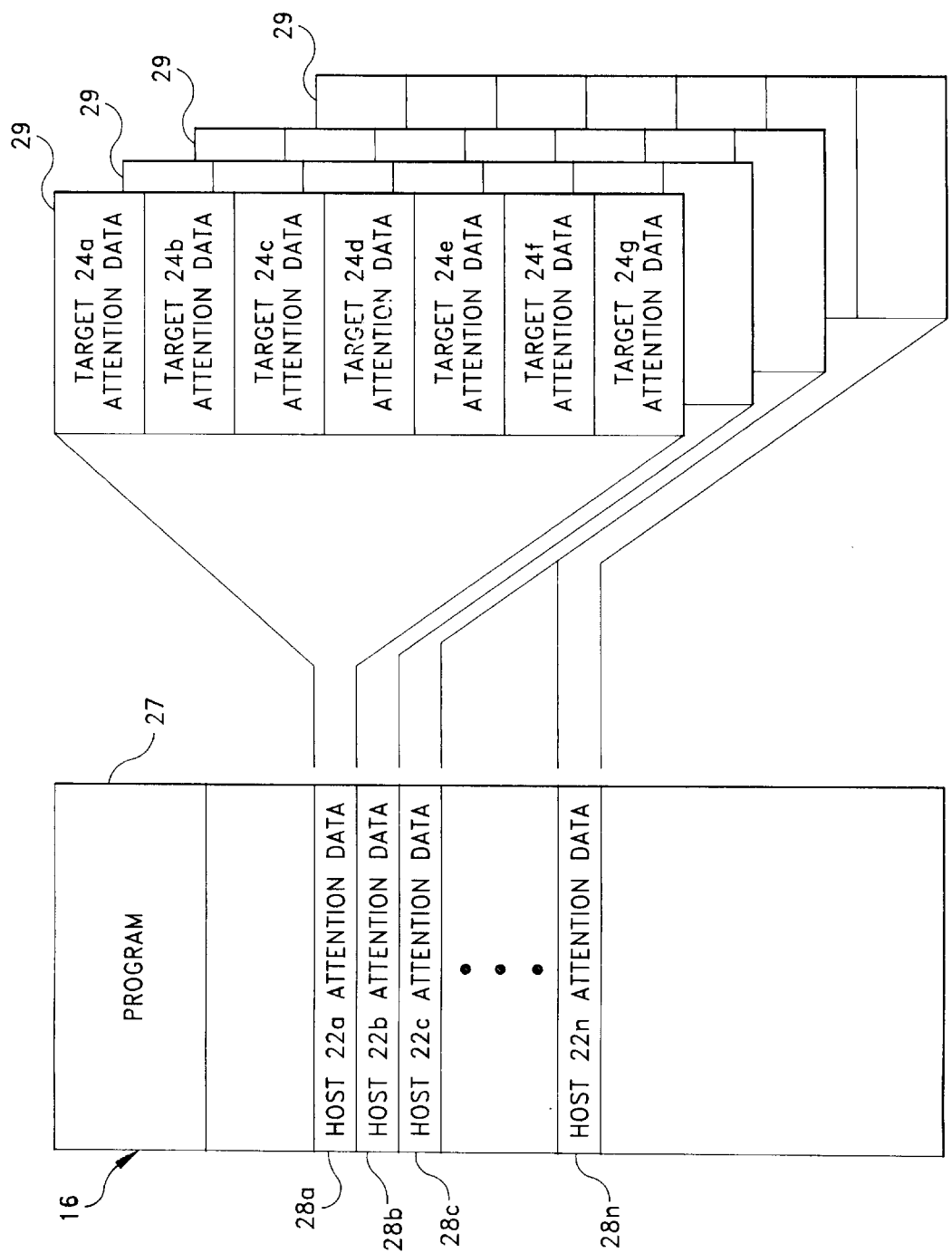
FIG. 2 is a block diagram showing the arrangement of the memory within the controller of FIG. 1.
Figure 3A:
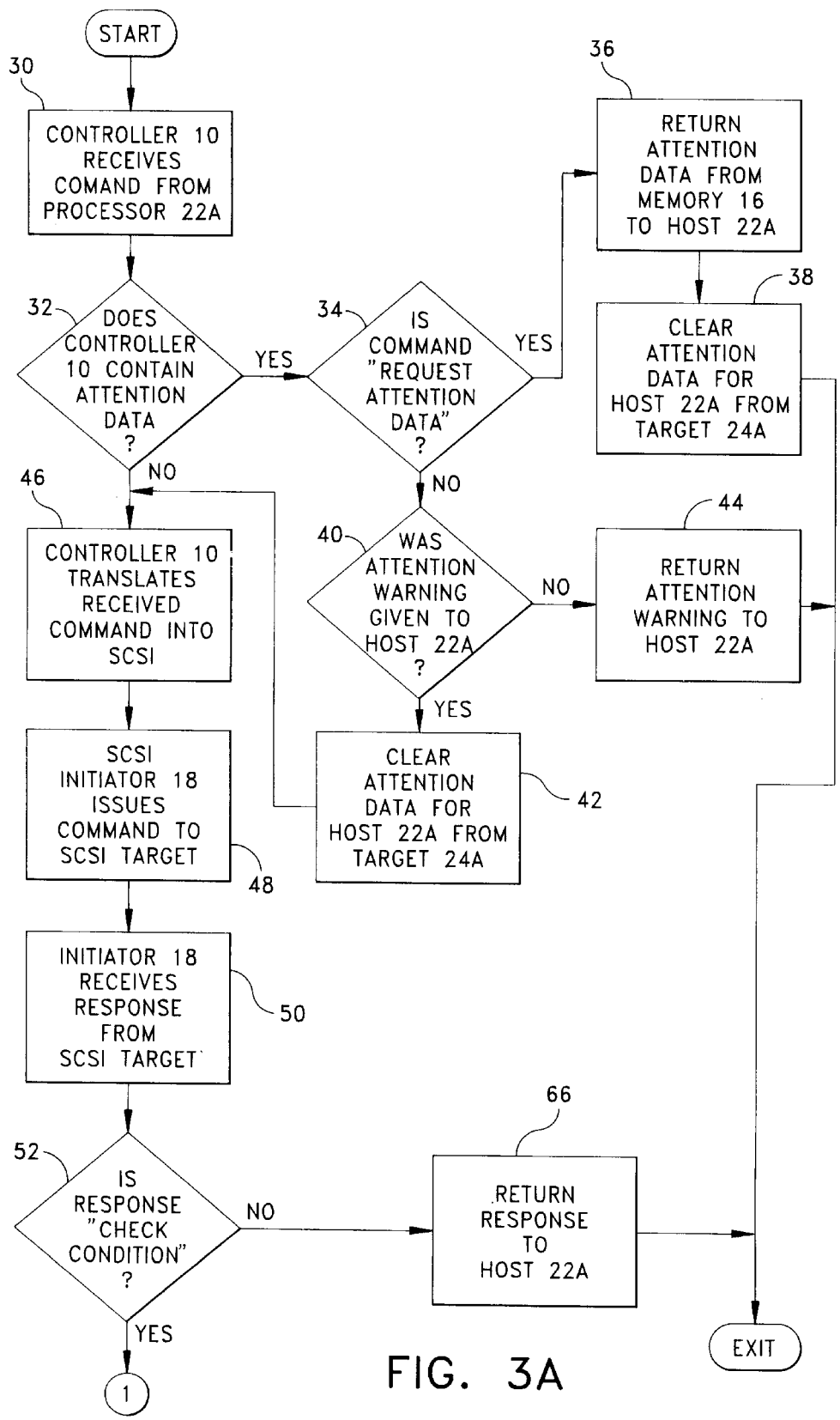
FIGS. 3A and 3B together comprise a flow chart depicting the operation of the controller of FIG. 1 when one of the host processors issues a command to the controller.
Figure 3B:
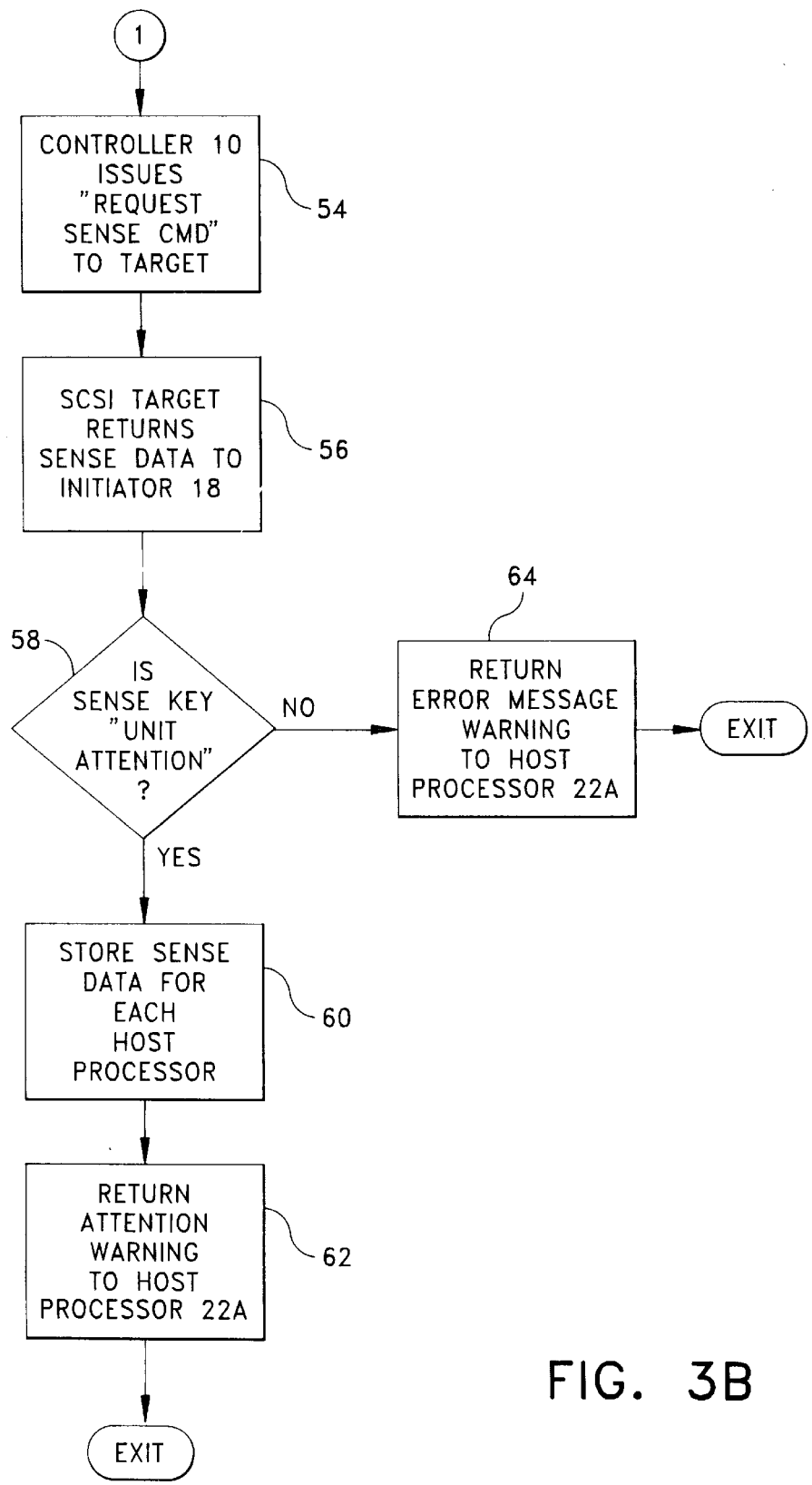

Memory 16, as; best shown in FIG. 2, represents a combination of static and dynamic Random Access Memory (RAM) and Read Only Memory (ROM) widely available to the public. The flow chart shown in FIGS. 3A and 3B is an operational sequence that can be either down loaded externally from an SCSI target and executed from RAM or permanently stored in ROM and executed from ROM or RAN. In any case, memory 16 represents the function that stores the program 27 and microprocessor 14 (FIG. 1) represents the function that executes the program 27.

FIG. 2 also shows that for each host processor 22a–n of FIG. 1 there is the storage of ATTENTION DATA for each target 24a–g of FIG. 1. The addresses for each host processor are shown as 28a–n. The information for each address is identical and is shown as 29.

Refer again to FIG. 1. The normal operation of the various components within controller 10 is well documented by the prior art. Personal computers, workstations, and embedded controllers are widely used by the public and the various operational sequences that control their internal components are executed by commercially available software packages. The specific embodiment herein describes how a personal computer, workstation, or embedded controller can be adapted to function as an interface to a plurality of host processors logically connected to one SCSI initiator with up to seven SCSI target devices. The flow chart shown in FIGS. 3A and 3B is an operational sequence that controller 10 executes when any of the host processors 22a–n issues a command through controller 10 to any of the SCSI targets 24a–g.

Before the flow chart in FIGS. 3A and 3B is described, a brief description of an SCSI UNIT ATTENTION condition is given. SCSI is an intelligent protocol whereby bus sequences and target/initiator conditions are monitored. There are a number of conditions designated as UNIT ATTENTION. It will be described using target 24a although it is to be understood it is the same for all targets 24a–g. These UNIT ATTENTION conditions exist when the controller 10 of an SCSI target 24a is reset, power to a target 24a is cycled from OFF to ON or from ON to OFF to ON, or media has been removed and replaced within the controller of target 24a. The last situation is typical of optical disks that can be removed from a disk controller without having to cycle power OFF and ON. Whenever one of these conditions occurs, if the SCSI initiator 18 sends a command to the SCSI target 24a, the controller of the target 24a responds with a CHECK CONDITION status. This status informs the requesting initiator 18 that a condition exists with the target 24a that may be of interest to the initiator 18. The initiator 18, at this point, can ignore the CHECK CONDITION status and reissue the command. Since the situation is a UNIT ATTENTION condition, the CHECK CONDITION is cleared and the target 24a processes the reissued command in the normal fashion. If the initiator 18 does not want to ignore the CHECK CONDITION status, it can issue an SCSI REQUEST SENSE command to the target. The internal controller of the target 24a then responds with SENSE DATA. This SENSE DATA contains a key that indicates whether the CHECK CONDITION status originally returned to the initiator 18 was due to a UNIT ATTENTION condition or some other condition. The embodiment described herein is concerned with CHECK CONDITION status due to UNIT ATTENTION.

Refer again to FIG. 1 for a description of the operational sequence that transpires when an SCSI target device is in a UNIT ATTENTION condition. Host processor 22a, interface 20a, host adapter 12a, and SCSI target 24a are referenced in the following sequence. However,, the sequence is applicable to all processors 22a–n, interfaces 20a–n, host adapters 12a–n, and targets 24a–g shown in FIG. 1.

Host processor 22a issues a command over interface 20a to host adapter 12a. Microprocessor 14, sensing either by polling host adapter 12a or receiving an interrupt signal from host adapter 12a, reads that command from host adapter 12a. Microprocessor 14 verifies that host processor 22a sent a valid command and passes this command to SCSI initiator 18. SCSI initiator 18 selects the designated SCSI target 24a, using the selection protocol defined by the ANSI SCSI standard. Once the target 24a is selected, the command is passed to it.

SCSI target 24a, having received a command from SCSI initiator 18 is in a UNIT ATTENTION condition and responds to SCSI initiator 18 with a CHECK CONDITION status. This status is read and recognized by microprocessor 14. Microprocessor 14 then automatically issues an SCSI REQUEST SENSE command to SCSI initiator 18 that in turn issues the command to SCSI target 24a. SCSI target 24a contains an embedded SCSI controller characteristic of peripheral devices with an SCSI interface. The controller, disposed within SCSI target 24a, contains the SENSE DATA that describes the nature of the CHECK CONDITION status.

Initiator 18 then receives the SENSE DATA from SCSI target 24a. Microprocessor 14 reads this SENSE DATA and checks a unique bit field designated the sense key. This bit field consists of four bits. If the bit pattern is a six hexadecimal, it indicates that a UNIT ATTENTION condition has occurred. If the bit pattern is something other than six, then a fault or failure may exist within SCSI target 24a.

Controller 10, having detected a UNIT ATTENTION condition at SCSI target 24a, stores this SENSE DATA for all host processors 22a–n connected to controller 10. Controller 10 maintains SENSE DATA of all SCSI targets 24a–g and for all host processors 22a–n. SENSE DATA received from SCSI targets 24a–g is stored in memory 16, in respective locations 28a–n, and is normally referred to as ATTENTION DATA in this disclosure.

Refer now to FIGS. 3A and 3B. At task box 30 a command is received from host processor 22a for selected SCSI target 24a. The controller 10 at decision box 32 checks its memory 16 to see if ATTENTION DATA is present at the appropriate address. This ATTENTION DATA would be present at the above appropriate address in memory 16 if a previous command received from one or more of host processors 22a–n for SCSI target 24a resulted in a CHECK CONDITION status and the ATTENTION DATA had not been cleared. If memory 16 within controller 10, at the appropriate address, does contain ATTENTION DATA, controller 10 determines if the received command is a REQUEST ATTENTION DATA command at decision box 34. If it is, then at task box 36 controller 10 returns the ATTENTION DATA from memory 16 to host processor 22a using microprocessor 14. Once the ATTENTION DATA has been returned to the requesting host processor 22a, controller 10 clears the ATTENTION DATA at the appropriate address in memory 16 for the requesting host processor 22a at task box 38. No other memory locations containing ATTENTION DATA within memory 16 are cleared by the action at task box 38.

If controller 10 does contain ATTENTION DATA at decision box 32, but the command received from host processor 22a is not REQUEST ATTENTION DATA at decision box 34, then controller 10 determines, at decision box 40, whether an ATTENTION WARNING was given to host processor 22a. The ATTENTION WARNING is a warning message sent from controller 10 to requesting host processor 22a indicating that controller 10 contains ATTENTION DATA in memory 16 at the address receiving ATTENTION DATA from SCSI target 24a for host processor 22a. If the warning was previously given and the command is not REQUEST ATTENTION DATA, then at task box 42 controller 10 clears the ATTENTION DATA at the address in memory 16 receiving ATTENTION DATA from SCSI target 24a for host processor 22a. If the ATTENTION WARNING was not provided to the requesting host processor 22a, then at task box 44 the warning is sent from controller 10 to the host processor 22a. At this point in the sequence, the host processor 22a can reissue the original command or send a REQUEST ATTENTION DATA command. If the reissued command is not REQUEST ATTENTION DATA, then all ATTENTION DATA stored in memory 16 is cleared at the address for that host processor 22a concerning the selected SCSI target 24a. The sequence is through boxes 30, 32, 34, 40, and 42. If the reissued command is REQUEST ATTENTION DATA, then the ATTENTION DATA is sent to the requesting host processor 22a and the ATTENTION DATA stored in the address at memory 16 for that host processor 22a and SCSI target 24a is cleared. The sequence is through boxes 30, 32, 34, 36, and 38.

When controller 10 receives a command from host processor at task box 30 and does not contain ATTENTION DATA at decision box 32, or the above sequence through boxes 30, 32, 34, 40, and 42 has taken place, controller 10 translates the received command into an SCSI command at task box 46 and sends it to SCSI initiator 18. SCSI initiator 18 interprets the SCSI command and selects the SCSI target 24a specified in the received command. SCSI initiator 18 then issues this command, at task box 48, to the selected SCSI target 24a and subsequently receives a response from the target 24a at task box 50. If at decision box 52 the response is a CHECK CONDITION, then controller 10 issues an SCSI REQUEST SENSE command to the selected SCSI target 24a at task box 54. The SENSE DATA is received by the initiator 18 from the SCSI target 24a at task box 56 and is read by controller 10 at decision box 58 to determine if the sense key is a six hexadecimal. If it is, then the received SENSE DATA is stored in memory 16 for every host processor 22a–n connected to controller 10 at task box 60 and an ATTENTION WARNING is sent to host processor 22a at task box 62 to complete the program. If the sense key is not a six hexadecimal, then an error message is sent to host processor 22a, at task box 64, to complete the program. This indicates that the SENSE DATA received from the SCSI target 24a is not UNIT ATTENTION DATA. The SENSE DATA received from SCSI target 24a in this case is not stored in memory 16.

Decision box 52 can also render a response that is not a CHECK CONDITION. In such a case, the response is returned to host processor 22a at task box 66.

There has therefore been described a method for having a microprocessor 14 based controller 10 for use with SCSI peripherals 24a–g that upon detecting an SCSI CHECK CONDITION status from a selected SCSI target such as 24a, automatically issues a REQUEST SENSE COMMAND to the selected SCSI target 24a. The SENSE DATA received from the SCSI target 24a is checked to determine if a UNIT ATTENTION condition exists. If it does, then the received SENSE: DATA is stored for all host processors 22a–n connected to the controller 10. The REQUEST SENSE COMMAND, in accordance with the SCSI protocol, clears all SENSE DATA in the selected SCSI target 24a after that data is sent to the controller 10. This clearing of SENSE DATA, in prior art devices, meant that the SENSE DATA was only available for one of the host processors 22a–n. The invention described herein removes that limitation by providing a method that automatically stores the SENSE DATA for all host processors 22a–n in memory 16 whenever a UNIT ATTENTION condition exists.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of providing any of a plurality of host processors ATTENTION DATA on any of a plurality of SCSI targets through a controller, said controller including a host adapter, microprocessor, only one SCSI initiator, and memory, with said memory comprising separate addresses for ATTENTION DATA from each of said plurality of SCSI targets for each of said plurality of host processors on a one to one basis so that ATTENTION DATA from one of said plurality of SCSI targets for one of said host processors can be cleared without clearing any other ATTENTION DATA, with said method comprising the steps of:

receiving at said controller a command from one of said plurality of host processors for one of said plurality of SCSI targets;

determining if said controller contains ATTENTION DATA from said one of said plurality of SCSI targets;

determining if said command is a request for ATTENTION DATA upon indication that said controller contains ATTENTION DATA from said one of said plurality of SCSI targets; and returning ATTENTION DATA from said controller to said one of said plurality of host processors for said one of said plurality of SCSI targets and clearing at said controller only the ATTENTION DATA for said one of said plurality of host processors from said one of said plurality of SCSI targets when said command is a request for ATTENTION DATA.

2. A method of providing any of a plurality of host processors ATTENTION DATA on any of a plurality of SCSI targets through a small computer system interface controller according to claim 1 further comprising the steps of:

determining if an attention warning was given to said one of said plurality of host processors when said command is not a request for ATTENTION DATA; and returning attention warning to said one of said plurality of host processors when said attention warning was not given.

3. A method of providing any of a plurality of host processors ATTENTION DATA on any of a plurality of SCSI targets through a small computer system interface controller according to claim 2 further comprising the steps of:

clearing ATTENTION DATA from said controller for said one of said plurality of host processors from said one of said plurality of SCSI targets when said attention warning was given to said one of said plurality of host processors;

translating by said controller said received command into SCSI when one of: (a) said controller does not contain ATTENTION DATA and (b) attention warning was given to said one of said host processors and ATTENTION DATA was cleared from said controller is present;

issuing said command from an only one SCSI initiator within said controller to said one of said plurality of SCSI targets when one of: (a) said controller does not contain ATTENTION DATA and (b) attention warning was given to said one of said host processors and ATTENTION DATA was cleared from said controller is present;

receiving a response from said one of said plurality of SCSI targets at said only one SCSI initiator and determining if said response is a CHECK CONDITION when one of: (a) said controller does not contain ATTENTION DATA and (b) attention warning was given to said one of said host processors and ATTENTION DATA was cleared from said controller is present; and returning said response to said one of said plurality of host processors when said response is not said CHECK CONDITION.

4. A method of providing any of a plurality of host processors ATTENTION DATA on any of a plurality of SCSI targets through a small computer system interface controller according to claim 3 further comprising the steps of:

issuing a request sense command from said controller to said one of said plurality of SCSI targets when said response is said CHECK CONDITION;

returning sense data from said one of said plurality of SCSI targets to said only one SCSI initiator when said response is said CHECK CONDITION;

determining if sense key on said returning sense data is UNIT ATTENTION when said response from said one of said plurality of SCSI targets at said only one SCSI initiator is said CHECK CONDITION;

storing sense data for each of said plurality of host processors when said sense key is UNIT ATTENTION; and returning attention warning to said one of said plurality of host processors when said sense key is UNIT ATTENTION.

5. A method of providing any of a plurality of host processors ATTENTION DATA on any of a plurality of SCSI targets through a small computer system interface controller according to claim 4 further comprising the step of returning error message warning to said one of said plurality of host processors when said sense key is not UNIT ATTENTION.

* * * * *